United States Patent [19]

Lassig et al.

[11] 3,857,501

[45] Dec. 31, 1974

[54] APPARATUS FOR LOADING CONTAINERS WITH CARGO

[75] Inventors: Harry Lassig; Anton Grosshauser, both of Hamburg-Schenefeld, Germany

[73] Assignee: Fordertechnische Forschungsgesellschaft mbH, Hamburg-Schenefeld, Germany

[22] Filed: Sept. 21, 1973

[21] Appl. No.: 399,471

Related U.S. Application Data

[62] Division of Ser. No. 247,287, April 25, 1972, Pat. No. 3,780,893.

[30] Foreign Application Priority Data

Feb. 5, 1972 Germany............................ 2205505

[52] U.S. Cl. ................................................ 214/41
[51] Int. Cl............................................. B65g 67/04
[58] Field of Search............ 214/6 P, 41; 53/26, 77, 53/159

[56] References Cited
UNITED STATES PATENTS
3,727,370 4/1973 Lassig............................... 214/41 X
3,727,777 4/1973 Hanson................................ 214/41

Primary Examiner—Robert G. Sheridan
Attorney, Agent, or Firm—Toren, McGeady and Stanger

[57] ABSTRACT

An apparatus for loading containers with cargo or for the compound stacking and setting down such cargo compounds on a loading platform of a transport vehicle or in a storage area in a warehouse a.s.o. The method comprises the steps of arranging the cargo in a predetermined manner by arranging the cargo in cargo units of a unit length corresponding substantially to the width of an available cargo space or cargo area, transferring such cargo units onto a hoisting track, hoisting the cargo units thereon up to the elevation of a conveying carriage, assembling a plurality of such cargo units on the conveying carriage in thereby forming a cargo compound of a length, width and height corresponding f.e. substantially to the internal cargo space dimensions of a container whereby the cargo units are moved through a contour sensing gate frame having gate wings which gate monitors the width and alignment of the cargo units being transferred onto the conveying carriage, driving the conveying carriage with the cargo compound assembled thereon into a cargo receiving area such as the internal cargo space of a container, moving the gate frame into a position adjacent the cargo receiving area, closing the gate wings on the gate frame and withdrawing the conveying carriage from the cargo receiving area whereby the gate wings serve as abutments and allow, during the reverse movement of the conveying carriage, to push the cargo compound of the conveying carriage so that the cargo will be put down on the cargo receiving area. The apparatus consists essentially of a base, a track, a conveying carriage, a gate frame, control and drive means and a mounting support for a container. Optionally a hoisting roller train and a feeding conveyor may be provided.

17 Claims, 10 Drawing Figures

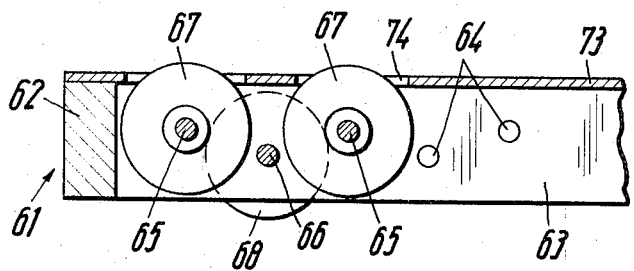
Fig. 3
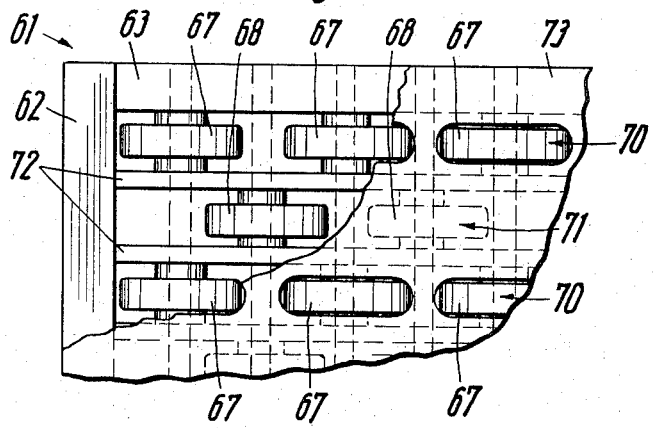
Fig. 4
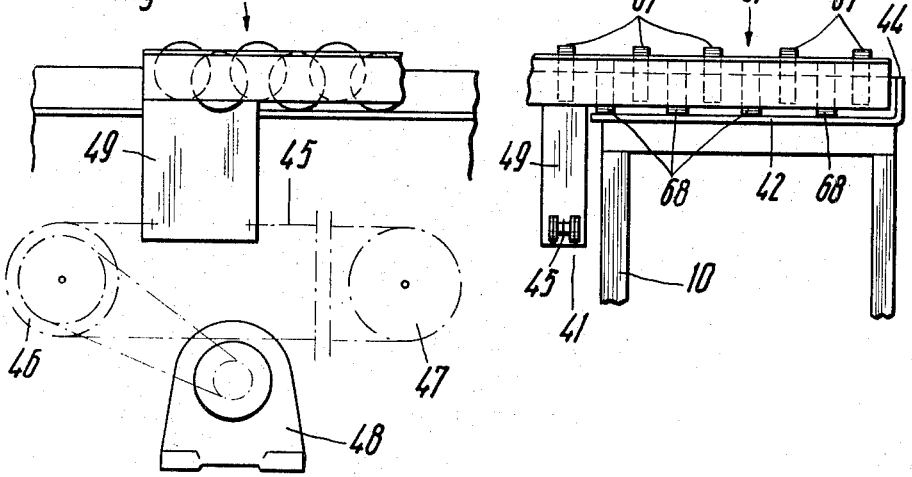
Fig. 5
Fig. 6

APPARATUS FOR LOADING CONTAINERS WITH CARGO

This application is a division of our co-pending application Ser. No. 247,287 filed Apr. 25, 1972, now U.S. Pat. No. 3,780,893.

The present invention relates to an apparatus for loading containers with cargo, preferably cargo disposed on pallets, and for putting down such cargo on loading platforms of transport vehicles and in warehouses.

Nowadays containers are finding progressively more and more widespread acceptance because of the rapid cargo handling facilities offered by such transport means. Especially in the field of from-door-to-door delivery the container attains an optimum effectiveness. Loading and transfer operations from road vehicles onto rail vehicles or from rail vehicles onto ships or vice versa may be performed at very high speeds that ar made possible by the sophisticated designs of cargo handling equipment such as van carriers, gantry hoists, gantry and traveling cranes allowing transport periods that could never ba achieved with conventional means. By its design, a container is nothing else than a big case with doors in which cargo may be stored spray-water proof and largely protected against adverse ambient influences. This advantage entails, however, the disadvantage of relatively poor loading facilities. Since standard containers have only one door opening at one of their narrow sides, the loading facilities are inevitably more restricted in comparison to a truck that is frcely accessible for loading from three sides.

It is therefore an object of the present invention to provide novel and improvived method and apparatus for loading containers with cargo, preferably cargo disposed on pallets.

It is another object of the present invention to provide an apparatus of the above type which allow an easy loading of containers in a minimum of time.

The present invention proposes an apparatus for carrying out the method of loading containers with cargo, preferably cargo on pallets, this apparatus comprising, in accordance with the present invention, a base with a track for supporting and guiding a movable conveying carriage adapted to receive a plurality of cargo carrying pallets arranged in a predetermined manner and occupying a total area substantially corresponding to the freight space area of a container to be loaded; a vertically adjustable support disposed at the track end facing the container and adapted to mount a container which is to be loaded and to raise or lower the container so that the upper surface of the floor of the container is substantially coplaner with the pallet receiving upper surface of the conveying carriage to achieve a step-free trasition from the conveying carriage to the container floor; and a gate-like clearance indicator frame in the region of the conveying carriage, the frame movable in the longitudinal direction of the track, having a width corresponding substantially to the width of the internal freight space of a container to be loaded and being adapted to align the load carrying pallets on the conveying carriage, the frame further including gate wings adapted to be moved towards and away from the feed path of the loaded pallets, control means for controlling the movements of the conveying carriage and of the clearance indicator frame as well as the pivotal movements of the gate wings in such a manner that when a pair of pallets having a combined overall length corresponding substantially to the width of the container internal freight space passes through the clearance indicator frame when this frame is disposed at the feeding and of the conveying carriage, with the gate wings being in a open position, the advancing movement of the pallets on the conveying carriage will be stopped if the combined overall length of the pallets exceeds the width of the container internal freight space and that after the pallets having been arranged on the conveying carriage the clearance frame will be moved to a position in front of the loading opening of the container, the conveying carriage with the pallets thereon will be moved into the container interior, the clearance frame gate wings will be closed, and after restracting the conveying carriage from the container interior the clearance indicator frame will be moved back into its initial position and the gate wings will be opened.

In accordance with another feature of the present invention, a roller train may be arranged upstream of the conveying carriage and the track, the roller train mounted on a vertically adjustable support adapted to be lifted up to the elevation of the conveying carriage and including a plurality of rollers wherein the axes of the rollers extend transversely of the feed direction of the conveying carriage. Feeding of loaded pallets to the hoisting roller train may be effected by means of a chain conveyor or the like arranged transversely of the conveying carriage. The loaded pallets are transferred from the chain conveyor onto the hoisting roller train by means of a pusher mechanism.

According to another feature of the present invention, the conveying carrige consists of a roller carriage adapted to roll on the track, the track forming a substantially plane rolling surface, the roller carriage being of a somewhat smaller width than the internal width of the load receiving container and including a substantially rectangular frame having longitudinal beams defining the lateral frame sides, the longitudinal beams provided with bores for receiving a plurality of roller bearing axes extending transversely of the fead direction of the roller carriage, each roller bearing axes mounting a plurality of rollers, the bores in the longitudinal beams being mutually offset so that the rollers on adjacent axes project beyond the frame alternately at the top and at the bottom of the frame. Due to this unique design, the roller carriage may be used for relatively large weights without these weights effected the feed speed. At its upper surface, the frame of the roller carriage is covered with an apertured metal sheet having a plurality of slot-shaped apertures arranged respectively in the regions in which portions of the rollers project beyond the upper surface plane defined by the rectangular frame. The track for the roller carriage comprises a mutually spaced pair of steel sheets mounted on the base, the pair steel sheets defining a longitudinal gap, the outer longitudinal edges of the steel sheets bent upwardly and forming lateral guide means for the roller carriage, a drag chain belt arranged in the gap between the pair of steel sheets constituting the track for the roller carriage, the chain belt connected to a downwardly extending projection of the roller carriage at the carriage end remote from the end facing the container, the chain belt guided at opposite ends of the track by guide sprocket wheels, one of the guide sprocket wheels being connected to a driving motor.

According to another feature of the present invention the support for mounting containers comprises a substantially rectangular base frame provided with a carrier element in each of its four corner regions, the carrier elements operatively connected to hoisting cylinders for an elevation adjustment of the support and adapted to be introduced in-to respective corner fittings on a container.

In accordance with another feature of the present invention the clearance indicator frame comprises a pair of gate wings disposed laterally of the track and the roller carriage, the gate wings mounted on carriages movable along lateral guide tracks on the base and adapted to be rotated towards and away from the pallets conveying track, the gate wings rotatable about vertical axes by means of power actuators. Drive means are provided for moving the carriages mounting the gate wings along the lateral guide tracks on the base. Control devices such a limit switches or the like are arranged in the fields of traverse of the gate wings, the control devices adapted to deactivate the apparatus when the gate wings are urged outwardly by cargo having an excess width from an initial gate wing position in which the gate wing clearance corresponds to the inner freight space width of a container to be loaded. During the advancing movement of the roller carriage carrying a plurality of pallets towards the container the gate wing carriages are adapted to follow the roller carriage whereby the gate wings are in a substantially closed position, and at the end of the track for the roller carriage the gate wing carriages are adapted to be arrested for allowing to withdraw the roller carriage from a position substantially fully inside a container. The power actuators for rotating the gate wings towards and away from the pallet conveying track consist of pneumatic cylinders that may be partially pressurized in the substantially closed position of the gate wings when advancing the roller carriage into a container. The pneumatic cylinders may be fully presurized in the substantially closed position of the gate wings when withdrawing the roller carriage from a container so that inside the container the pallets may be pushed off the roller carriage and will be put down on the floor of the container.

Further objects and the advantages of the present invention will appear from the following description of a preferred embodiment of an apparatus for loading containers according to the present invention shown in the appended drawing wherein.

FIG. 3 is a fragmentary view of the roller carriage, partly in elevation and partly in vertical cross-section;

FIG. 4 is a fragmentary top view of the roller carriage;

FIG. 5 is a lateral elevational view of the drive means for the roller carriage;

FIG. 6 is a fragmentary front elevational view of the roller carriage and of the running track therefor;

Figure 1:
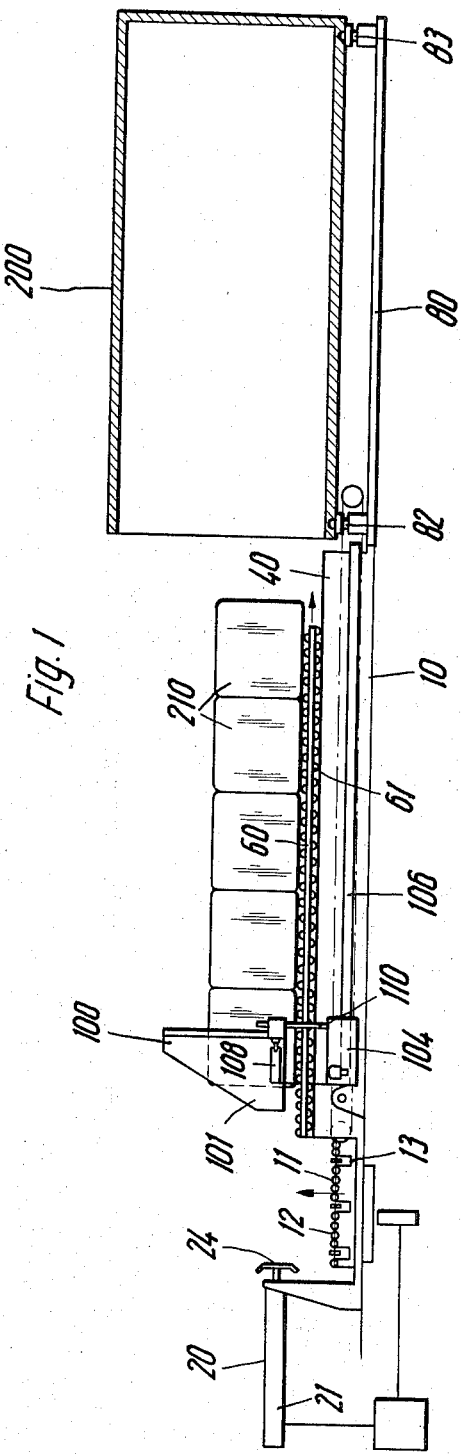
FIG. 1 is a schematical lateral elevational view of a preferred embodiment of the inventive apparatus and depicting the roller carriage, the track and the support for mounting a container.

The apparatus for loading containers with cargo preferably on pallets generally comprises a base 10 mounting a track 40 for a conveying carriage 60 and a support 80 for mounting a container 200 which is to be loaded. The base 10 is also provided with a clearance indicator frame 100 serving to sense the contours of the cargo when transferring the loaded pallets onto the roller conveying carriage 60 and when driving the pallets into the container.

The cargo carrying pallets are supplied to the apparatus preferably by means of a feeding conveyor which may have the form of a chain conveyor 15 and conveys such pallets towards a roller train 11 the rollers 12 of which are mounted on axes extending transversely of the feed direction of the conveying carriage 60. The hoisting roller train 11 is mounted in a vertically adjustable support 13 so that the roller train 11 may be elevated substantially up to the elevation of the conveying roller carriage 16. The feeding conveyor having the form of a chain conveyor 15 is operatively associated with the hoisting roller train 11 so that a correct transfer of loaded pallets 210 onto the hoisting roller train 11 is assured. The feeding conveyor 15 extends in the base 10 preferably transversely of the feed direction of the conveying carriage 60. The transfer of loaded pallets 210 from the hoisting roller train 11 onto the conveying carriage 60 is effected by means of a pusher mrchanism 20 arranged in the transfer region of pallets 210 from the feeding conveyor 15 onto the hoising roller train 11 and movable in a direction parallel to the feed direction of the conveying carriage. The pusher mechanism 20 in operatively coupled to an actuating mechanism 21. An apjustable limit stop 30 located at the rear end of the feeding conveyor 15 may be adjusted into predetermined positions depending upon the width of the internal freight space of a container 200. This limit stop 30 defines the position of the advance path of loaded pallets on the conveying carriage (FIGS. 1 and 2).

The conveying carriage 60 essentially consists of a "carpet-like" roller carriage 61 movable along the pathway defined by the substantially plane track 40. The roller carriage 61 is of a somewhat smaller width than the internal width of the freight space within a container that is to be loaded. The length of the roller carriage 61 exceeds somewhat the length of the container. The roller carriage 61 comprises a substantially rectangular frame 62 with longitudinal beams 63 defining the longitudinal sides of the frame 62. In FIGS. 3 and 4 only one of these two longitudinal beams 63 of the frame 62 is shown. The longitudinal beams 63 are provided with bores 64 for receiving the axes 65, 66 for the rollers 67, 68. The bores 64 for the roller axes 65, 66 provided in the longitudinal beams 63 of the frame 62 are "staggered" in such a manner that succeeding rows of rollers 67, 68 project alternately at the top and at the bottom beyond the frame 62 (FIG. 3). Every axis 66 disposed betwen two adjacent axes 65 is offset with respect to these axes 65, i.e. the axes 66 define a plane spaced below a plane defined by the axes 65. Thus the rollers 67, 68 in every longitudinal row of rollers 70 or 71 respectively (see FIG. 4) are mutually offset in such a manner that the lower axes 66 of every alternate longitudinal row of rollers 71 extend between pairs of rollers 65 of every other adjacent longitudinal row of rollers 70. The roller axes 65, 66 support a plurality of mutually spaced intermediate longitudinal web plates 72 extendimg in a direction parallel to the longitudinal frame beams 63. The specing between any two intermediate longitudinal web plates 72 is chosen such that the rollers in each longitudinal row of rollers 70, or 71 respectively are disposed in the clearance provided between mutually adjacent pairs ot intermediate web plates 72. The frame 62 of the roller carriage 61 is covered at its upper surface with an apertured metal sheet 73 having a plurality of slot-shaped apertures 74 arranged respectively in the regions in which portions of the rollers 67 project above the upper surface plane defined by the frame 62 (FIGS. 3 and 4).

Figure 2:
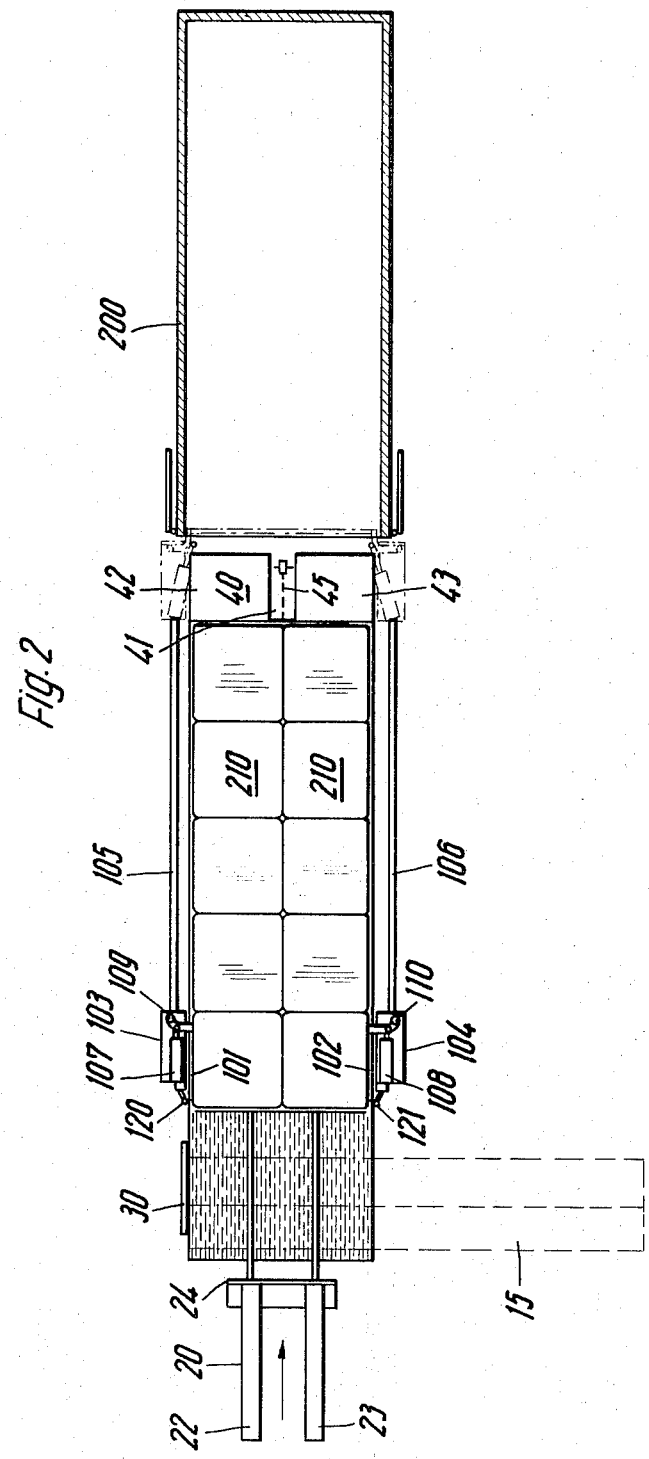
FIG. 2 is a top view of the apparatus shown in FIG. 1.

The track 40 mounted in the base 10 and forming a pathway for the roller carriage 61 consists of a pair of mutually spaced steel plates 42, 43 mounted likewise on the base 10 and defining a longitudinal gap 41 (FIGS. 2 and 6). The other longitudinal edges 44 of the steel sheets 42, 43 are bent upwardly and define lateral guides for the roller carriage 61 (FIG. 6). A drag chain belt 45 is arranged in the gap 41 between the two steel sheets 42, 43. The chain belt 45 is connected to a downwardly extending projection 49 of the roller carriage 61 at the carriage end remote from the end facing the container 200. At opposite ends of the track 40 the chain belt 45 passes around guide sprocket wheels 46, 47, and one of these sprocket wheels, i.e., the sprocket wheel 46 is connected to a driving motor 48 (FIG. 5).

Figure 7:
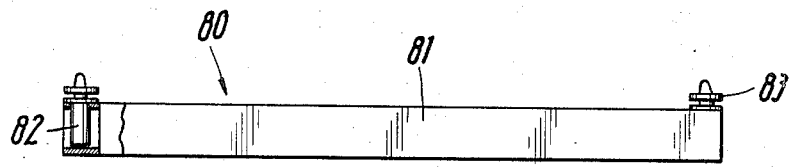
FIG. 7 is a lateral elevational view of the support for mounting a container.
Figure 8:
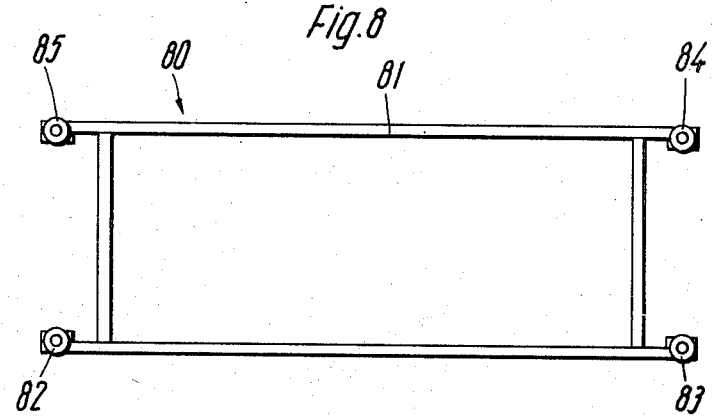
FIG. 8 is a top view of the support shown in FIG. 7.
Figure 9:
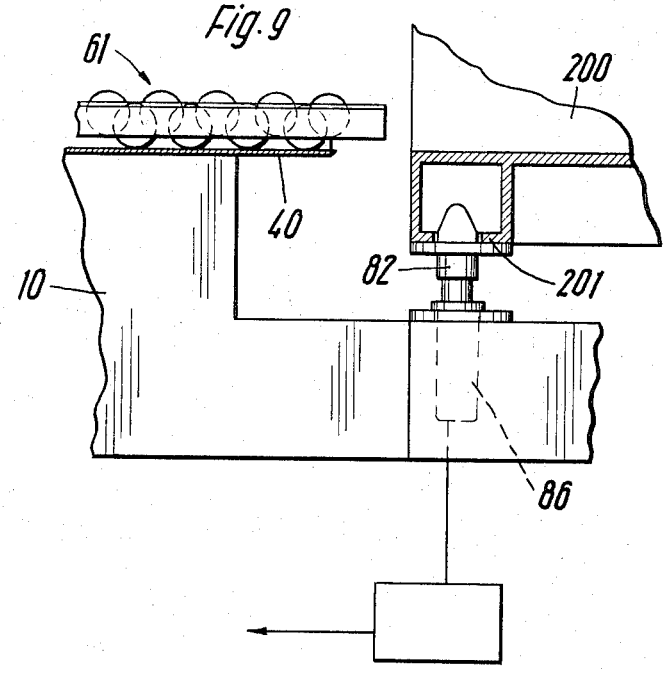
FIG. 9 is a fragmentary view of the container support with part of container mounted thereon, partly in elevation and partly in vertical cross-section.

Referring to FIGS. 7, 8 and 9 the support 80 for mounting a container 200 consists of a substantially rectangular base frame 81 having in its four corner regions carrier elements 82, 83, 84, 85, adapted to be introduced into matingly shaped corner fittings 201, on a container 200, as shown in FIG. 9. The carrier elements 82, 83, 84, 85 serve to lock a container 200 that is to be loaded in position, and each carrier element 82 to 85 is operatively connected to a hoisting cylinder 86 allowing an elevation adjustment of the container mounting support 80 so that the upper surface of the container inner floor may be adjusted at an elevation at which the container floor is coplanar with an upper surface plane defined by the roller carriage 61. This feature assures a step-free continuous transition of loaded pallets from the roller carriage 61 into the internal freight space of a container.

The clearance indicator frame 100 performing a control function by sensing the cargo loaded pallets and serving simultaneously for control purpose comprises a pair of lateral gate wings 101, 102 disposed on either side of the track 40 and of the roller carriage 61. The gate wings 101, 102 are mounted in carriages 103, 104 movable along lateral guide tracks 105, 106 respectively on the base 10. The gate wings 101, 102 are rotatably mounted about vertical axes 109, 110 by means of power actuators indicated in FIG. 2 at 107 and 108 respectively. These power actuators allow to rotate the gate wings 101, 102 towards and away from the pallet feeding path. The gate wing carriages 103, 104 with the gate wings 101, 102 may also be moved along the guide tracks 105, 106 by means of suitable drive means not shown in the drawings. Control devices 120, 121 preferably in the form of limit switchers are arranged in the fields of traverse of the gate wings 101, 102. Control devices of a different type such a light barriers or the like may also be used. The purpose of these control devices 120, 121 is to monitor an outward rotational movement of the gate wings 101, 102 from an initial gate wing position in which the gate wing clearance corresponds to the inner freight space width of a container to be loaded if such outward rotational movement is caused by cargo having an excess width, to deactivate the whole apparatus. The movement of the gate wing carriages 103, 104 with the gate wings 101, 102 is arranged in such a manner that during the advancing movement of the roller carriage 61 the gate wing carriages 103, 104 trail the roller carriage 61 whereby the gate wing 101, 102 are rotared into the closed position. At the end of the track 40 for the roller carriage 61 the clearance indicator frame 100 may be locked in position with the gate wings 101, 102 closed. The power actuators 107, 108 for the gate wings 101, 102 may consist of pneumatic cylinders to which a relatively small fluid pressure, i.e., a partial pressure is supplied when the gate wings 101, 102 are at the track end facing the container 200 and the roller carriage 61 is driven into the container 200. When withdrawing the roller carriage 61 from the container 200 full fluid pressure is supplied to the pneumatic cylinders 107, 108 so that the pallets with the cargo thereon may be put down on the internal freight space of the container.

Figure 10:
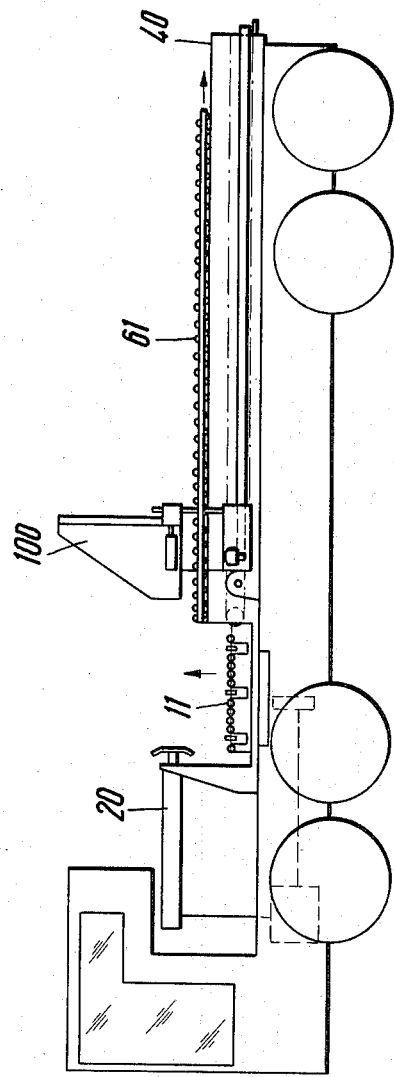
FIG. 10 is a schematical side elevational view of the apparatus for loading containers wherein the apparatus mounted on a vehicle chassis.

It is considered to be within the scope of the present invention to combine the base 10 with the hoisting roller train 11, the track 40 and the roller carriage 61 in a movable assembly. It is likewise possible to mount the overall apparatus for loading containers on the chassis of a vehicle as illustrated in FIG. 10. The lastmentioned modified embodiment also allows to put down cargo on loading platforms of transport vehicles and in storage areas in warehouses, storage yards and the like. Thus the scope of application of the inventive apparatus for loading containers is greatly enlarged.

The operation of the inventive apparatus for loading containers is as follows:

Two pallets having a combined overall length corresponding substantially to the width of the internal freight space of a container are fed, one inmediately behind the other, on the feeding conveyor 15 to the hoisting roller train 11. On the hoisting roller train 11 the movement of the pallets is stopped in a predetermined position and the pallets are hoisted up to the elevation of the roller carriage 61. The pusher mechanism 20 which preferably comprises hydraulic cylinders 22, 23 and a thrust bar 24 (FIG. 2) pushes the two pallets onto the roller carriage 61 so that the hoisting roller train 11 may be lowered again to receive another pair of pallets.

These steps are repeated whereby the number of pallets required for filling the container freight space are successively transferred to the roller carriage 61 and each pair of pallets transferred onto the roller carriage advances, i.e., pushes ahead the pallets that are already disposed on the roller carriage towards the container until the first pair of pallets reaches the end of the roller carriage 61. The total area occupied by the pallets 210 on the roller carriage 61 corresponds substantially to the internal freight space area of a container 200 which is to be loaded. Since the length of the roller carriage 61 corresponds substantially to the length of the internal freight space of the container 200, a pallet cargo compound substantially free from interstices and practically fully occupying the internal freight space of the container may be formed.

When the pallets are transferred onto the roller carriage 61 the pallets pass the gate-like clearance indicator frame 100 the gate wings 101, 102 of which are in the open position in that time. The pneumatic cylinders 107, 108 perform the opening and closing movements of the gate wings 101, 102. Both the opened and the closed positions of the gate wings 101, 102 are sensed respectively by means of the limit switches 120, 121. The gate clearance width defined by the more or less widely opened gate wings 101, 102 is selected so as to correspond exactly to the internal width of the container freight space. Whenever pallets are transferred which have a combine overall length exceeding the maximum internal width of the container such pallets urge, during the transfer operation, the gate wings 101, 102 into a more widely opened position so that the limit switches 120, 121 will be actuated by the gate wings and the overall apparatus will be deactivated so that no further pallets may be supplied to the roller carriage 61.

When all pallets that are required for fully loading a container have been transferred onto the roller carriage 61 the latter is driven by means of the chain belt 45 along the track 40 into the container 200 whereby as mentioned above the roller carriage 61 moves along a plane coinciding with the floor of the container. During this operation, the gate wings 101, 102 are closed behind the last two palltes and are then driven by their associated drive motor (not shown) along the guide tracks 105, 106 in the same direction and with the same speed as the roller carriage 61, i.e., the gate wings trail the roller carriage 61.

If some part of the cargo should have become displaced and no longer pass freely through the container opening into the container, then this part of the cargo and the pallets ligned up behind will the shifted on the roller carriage 61 and thus be urged against the gate wings 101, 102. Since the pneumatic cylinders 107, 108 mounted on the gate wing carriages 103, 104 are only partly pressurized in this part of the operation the gate wings 101, 102 will thus be opened, the limit switches 120, 121 will be actuated and the driving motor 48 for the roller carriage 61 will be stopped. As soon as the pallets have entirely entered the container 200 the gate wings 101, 102 will be locked in position, i.e., preferably locked to the frame 81 of the container support 80, and the full fluid pressure will be supplied to the pneumatic cylinders 107, 108. The direction of rotation of the gear motor 48 driving the roller carriage 61 is then reversed and the roller carriage 61 withdrawn from the container whereby the roller carriage 61 passes below the closed gate wings 101, 102 now serving as abutments. During this reverse movement of the roller carriage the pallets are pushed off the roller carriage 61 within the container and in this manner put down on the container floor.

The mounting of containers 200 on the support 80 is effected such that the container 200 is simply lowered onto the extended carrier elements 82, 83, 84, 85. These carrier elements 82 to 85 are disposed on the upper ends of hydraulic hoisting cylinders 86 having preferably a lifting stroke of approximately 2 inches. The container is then detached from the container transport gear and the container doors are opened. Then the carrier elements 82 to 85 on the hydraulic cylinders 86 may be lowered by venting corresponding associated valves (not shown) until the upper surface of the container floor is substantially coplanar with the upper bearing surface defined by the roller carriage 61. The vertical height adjustment of the container support 80 may also be performed by any other suitable or conventional means.

As may now be seen from the foregoing description, the present invention provides a method and an apparatus for automatically loading cargo in the form of parcels, bales, bundles, mixed cargo, piece-goods, cargo on pallets and the like into containers. The general design of the proposed loading apparatus allows a highly efficient loading of containers in a minimum of time. An important advantage if the inventive method and apparatus resides in the fact that the total internal freight space of the container may be loaded with cargo. The inventive apparatus senses displaced pallet cargo and thus allows a trouble-free loading of containers.

The embodiments of the invention in which an exclusive property or privilege are claimed are defined as follows:

1. An apparatus for loading containers with cargo, preferably cargo on pallets, and for putting down such cargo on loading platforms of transport vehicles and in storage areas in warehouses, storage yards and the like, said apparatus comprising a base with a track for supporting and guiding a movable conveying carriage adapted to receive a plurality of cargo-carrying pallets arranged in a predetermined manner and occupying a total area substantially corresponding to the freight space area of a container to be loaded; a vertically adjustable support disposed at the track end facing said container and adapted to mount a container which is to be loaded and to raise or lower said container so that the upper surface of the floor of said container is substantially coplanar with the pallet receiving upper surface of said conveying carriage to achieve a step-free transition from said conveying carriage to said container floor; and a gate-like clearance indicator frame in the region of said conveying carriage, said frame movable in the longitudinal direction of said track, having a width corresponding substantially to the width of the internal freight space of a container to be loaded and being adapted to align said load-carrying pallets on said conveying carriage, said frame further including gate wings adapted to be moved towards and away from the feed path of said loaded pallets, control means for controlling the movements of said conveying carriage and of said clearance frame as well as the pivotal movements of daid gate wings in such a manner that when a pair of pallets having a combined overall length corresponding substantially to the width of said container internal freight space passes through said clearance frame, when said frame is disposed at the feeding end of said conveying carriage, with said gate wings being in an open position, the advancing movement of said pallets on said conveying carriage will be stopped if the combined overall length of daid pallets exceeds the width of said container internal freight space and that after said pallets having been arranged on said conveying carriage, said clearance indicator frame will be moved to a position in front of the loading opening of said container, said conveying carriage with said pallets thereon will be moved into said container interior, said clearance frame gate wings will be closed, and after retracting said conveying carriage from said container interior said clearance frame will be moved back into its initial position and said gate wings will be opened.

2. An apparatus as defined in claim 1 wherein a roller train is arranged upstream of said conveying carriage and said track, said roller train mounted on a vertically adjustable support adapted to be lifted up to the elevation of said conveying carriage and including a plurality of rollers wherein the axes of said rollers extend transversely of the feed direction of said conveying carriage.

3. An apparatus as defined in claim 1 wherein a roller train is arranged upstream of said conveying carriage and said track, said roller train mounted on a vertically adjustable support adapted to be lifted up to the elevation of said conveying carriage and including a plurality of rollers wherein the axes of said rollers extend transversely of the feed direction of said conveying carriage; a feeding conveyor for feeding loaded pallets to said roller train arranged transversely of said conveying carriage and having the form of a chain conveyor or the like, a pusher mechanism in the transfer area in which said pallets are transferred from said feeding conveyor to said roller train, said pusher mechanism including drive means and operative generally in the feed direction of said conveying carriage, and an adjustable limit stop adapted to be adjusted in a position correlated to the width of said container internal freight space.

4. An apparatus as defined in claim 1 wherein said conveying carriage consists of a roller carriage adapted to roll on said track, said track forming a substantially plane rolling surface, said roller carriage being of a somewhat smaller width than the internal width of said load receiving container and including a substantially rectangular frame having longitudinal beams defining the lateral frame sides, said longitudinal beams provided with bores for receiving a plurality of roller bearing axes extending transversely of the feed direction of said roller carriage, each roller bearing axis mounting a plurality of rollers, said bores in said longitudinal beams being mutually offset so that the rollers on adjacent axes project beyond said frame alternately at the top and at the bottom of said frame.

5. An apparatus as defined in claim 4 wherein the rollers on said transverse roller axes form, in the longitudinal direction of said frame, longitudinal rows of rollers, and alternate longitudinal rows of rollers are mutually offset such that the roller axes in every other longitudinal row of rollers extend between pairs of rollers of every other adjacent longitudinal row of rollers, 6. An apparatus as defined in claim 5 wherein said roller axes support a plurality of mutually spaced intermediate longitudinal web plates extending in a direction parallel to said longitudinal beams of said rectangular frame and that between every adjacent pair of web plates each roller axis mounts one roller.

7. An apparatus as defined in claim 6 wherein said rectangular roller carriage frame is covered, at its upper surface, with an apertured metal sheet having a plurality of slot-shaped apertures arranged respectively in the regions in which portions of said rollers project beyond the upper surface plane defined by said rectangular frame.

8. An apparatus as defined in claim 4 wherein said track for said roller carriage comprises a pair of mutually spaced steel sheets mounted on said base, said pair of steel sheets defining a longitudinal gap, the outer longitudinal edges of said steel sheets bent upwardly and forming lateral guide means for said roller carriage, a drag chain belt arranged in said gap between said pair of steel sheets constituting said track for said roller carriage, said chain belt connected to a downwardly extending projection of said roller carriage at the carriage end remote from said end facing said container, said chain belt guided and opposite ends of said track by guide sprocket wheels, one of said sprocket wheels being connected to a driving motor.

9. An apparatus as defined in claim 1 wherein said support for mounting containers comprises a substantially rectangular base frame provided with a carrier element in each of its four corner regions, said carrier elements operatively connected to hoisting cylinders for an elevation adjustment of said support and adapted to be introduced into respective corner fittings on a container.

10. An apparatus as defined in claim 1 wherein said clearance indicator frame includes a pair of gate wings disposed laterally of said track and said roller carriage, said gate wings mounted on carriages movable along lateral guide tracks on said base and adapted to be rotated towards and away from said pallet conveying track, said gate wings rotatable about vertical axes by means of power actuators.

11. An apparatus as defined in claim 10 wherein drive means are provided for moving said carriages mounting said gate wings along said lateral guide tracks on said base.

12. An apparatus as defined in claim 1 wherein control devices such as limit switches or of the like are arranged in the fields of traverse of said gate wings, said control devices adapted to deactivate said apparatus when said gate wings are urged outwardly by cargo having an excess width from an initial gate wing position in which the gate wing clearance corresponds to the inner freight space width of a container to be loaded.

13. An apparatus as defined in claim 12 wherein during the advancing movement of said roller carriage carrying a plurality of pallets along said track towards said container said gate wing carriages are adapted to follow said roller carriage whereby said gate wings are in a substantially closed position, and to be arrested at the end of said track for said roller carriage for allowing to withdraw said roller carriage from a position substantially fully inside a container.

14. An apparatus as defined in claim 10 wherein said power actuators for rotating said gate wings towards and away from said pallet conveying track consist of pneumatic cylinders that may be partially pressurized in the substantially closed position of said gate wings when advancing said roller carriage into a container.

15. An apparatus as defined in claim 14 wherein said pneumatic cylinders may be fully pressurized in the substantially closed position of said gate wings when withdrawing said roller carriage from a container.

16. An apparatus as defined in claim 4 wherein said base with said hoisting roller train, said track and said roller carriage form a movable assembly.

17. An apparatus as defined in claim 4 wherein said base with said hoisting roller train, said track and said roller carriage are mounted on the chassis of a vehicle.

* * * * *